United States Patent
Hussain et al.

(10) Patent No.: US 9,345,083 B2
(45) Date of Patent: May 17, 2016

(54) BOOST CONVERTER WITH A PULSE FREQUENCY MODULATION MODE FOR OPERATING ABOVE AN AUDIBLE FREQUENCY

(71) Applicant: Apple Inc., Cupertino, CA (US)

(72) Inventors: Asif Hussain, San Jose, CA (US); Behzad Mohtashemi, Los Gatos, CA (US); Mohammad J. Navabi-Shirazi, Sunnyvale, CA (US); Jingdong Chen, San Jose, CA (US); Manisha P. Pandya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/503,037

(22) Filed: Sep. 30, 2014

(65) Prior Publication Data
US 2015/0115813 A1    Apr. 30, 2015

Related U.S. Application Data

(60) Provisional application No. 61/897,796, filed on Oct. 30, 2013.

(51) Int. Cl.
H05B 37/02 (2006.01)
H05B 33/08 (2006.01)
G09G 3/34 (2006.01)

(52) U.S. Cl.
CPC ............ *H05B 33/0815* (2013.01); *G09G 3/342* (2013.01); *G09G 3/3406* (2013.01);
(Continued)

(58) Field of Classification Search
CPC .... H05B 37/02; H05B 33/08; H05B 33/0803; H05B 33/0809; H05B 33/15; H05B 33/0842; G09G 2310/08; G09G 2320/0233; G09G 2320/064; G09G 3/3406
USPC ............. 315/186, 209 R, 224, 291, 307–311; 345/102, 204
See application file for complete search history.

(56) References Cited

U.S. PATENT DOCUMENTS 6,771,281 B2    8/2004  Takagi
8,035,315 B2    10/2011 Zhao et al.
(Continued)

FOREIGN PATENT DOCUMENTS

CN    1388706    1/2003
CN    2724137    9/2005
(Continued)

OTHER PUBLICATIONS

Chinese Patent for Utility Model No. ZL201420799838.7—Utility Patentability Evaluation Report (UMPER) issued by Chinese Patent Office on Aug. 28, 2015.
(Continued)

Primary Examiner — Jimmy Vu
(74) Attorney, Agent, or Firm — Downey Brand LLP (57) ABSTRACT

The embodiments discussed herein relate to systems, methods, and apparatus for executing a pulse frequency modulation (PFM) mode of a boost converter in order to ensure that a switching frequency of the boost converter is a above an audible frequency threshold. In this way, a user operating a display device that is controlled by the boost converter will not be disturbed by audible noises generated at the display device. The PFM mode enforces an audible frequency threshold by using control circuitry designed to increase or decrease the frequency of a pulse signal depending on how the frequency of the pulse signal changes over time. The control circuitry can apply an additional load to the boost converter in order to increase the frequency of the pulse signal when the frequency is approaching the audible frequency threshold.

20 Claims, 6 Drawing Sheets

(52) U.S. Cl.
CPC .... *G09G2310/08* (2013.01); *G09G 2320/0233* (2013.01); *G09G 2320/064* (2013.01); *Y02B 20/346* (2013.01)

(56) References Cited

U.S. PATENT DOCUMENTS

| | | |
|---|---|---|
| 8,569,965 B2 | 10/2013 | Uchimoto et al. |
| 8,884,867 B2 | 11/2014 | Hussain et al. |
| 2002/0180745 A1 | 12/2002 | Matsuda et al. |
| 2009/0261789 A1* | 10/2009 | Chang .................. H02M 5/458 323/234 |
| 2011/0001739 A1 | 1/2011 | Yamagishi |
| 2011/0273433 A1* | 11/2011 | Ahn ..................... G09G 3/3696 345/213 |
| 2011/0316449 A1 | 12/2011 | Imanaka |
| 2012/0068978 A1 | 3/2012 | Aitken et al. |
| 2013/0169697 A1 | 7/2013 | Park et al. |

FOREIGN PATENT DOCUMENTS

| | | |
|---|---|---|
| CN | 201657109 | 11/2010 |
| CN | 101944348 | 1/2011 |
| CN | 102257881 A | 11/2011 |
| JP | 2000242233 | 9/2000 |
| TW | 530294 B | 5/2003 |
| TW | 200504634 A | 2/2005 |
| TW | 201220282 A | 5/2012 |
| TW | 201228462 A | 7/2012 |
| TW | 201342357 A | 10/2013 |

OTHER PUBLICATIONS

Taiwanese Patent Application No. 103137269—Office Action dated Dec. 24, 2015.

* cited by examiner

BOOST CONVERTER WITH A PULSE FREQUENCY MODULATION MODE FOR OPERATING ABOVE AN AUDIBLE FREQUENCY

CROSS-REFERENCE TO RELATED APPLICATIONS

The present application claims the benefit of U.S. Provisional Application No. 61/897,796, entitled "BACKLIGHT DRIVER CHIP PHASE LOCK LOOP (PLL) WITH PROGRAMMABLE OFFSET/DELAY" filed Oct. 30, 2013, the contents of which is incorporated herein by reference in its entirety for all purposes.

The present application is also related to U.S. application Ser. No. 14/502,945, entitled "BACKLIGHT DRIVER CHIP INCORPORATING A PHASE LOCK LOOP (PLL) WITH PROGRAMMABLE OFFSET/DELAY AND SEAMLESS OPERATION" filed concurrently herewith, the contents of which is incorporated herein by reference in its entirety for all purposes.

FIELD OF THE DESCRIBED EMBODIMENTS

The described embodiments relate generally to systems, methods, and apparatus for improving display devices using a backlight controller. Specifically, the embodiments relate to improving noise reduction in display devices using a backlight controller that can operate in a pulse frequency modulation mode.

BACKGROUND

Display devices have in recent times been adapted to project a wide variety of media not limited to video games, movies, applications, among many other forms of media. However, during operation, certain display devices can project audible noise because of certain signals within the display device being transmitted at audible frequencies. Such signals can correspond to switching signals used to turn on and off light emitting diodes (LED's) within the display device. When adjusting a frequency of the switching signals, the power consumption of the display device can be negatively affected because of the charge required to switch on and off each LED. Therefore, reducing noise in display devices can prove futile in some cases when a manufacturer is attempting to reduce noise while also designing the display device to be energy efficient.

SUMMARY

This paper describes various embodiments that relate to systems, methods, and apparatus for enforcing a minimum switching frequency at a display device in order to minimize audible noise. In some embodiments, a control circuit for a display device is set forth. The control circuit can include a boost circuit configured to output a switching signal to a subsystem of the display device based on a cycle period. The control circuit can further include a timing circuit configured to detect a frequency of the switching signal. The control circuit can be configured such that when the timing circuit does not detect a pulse in the switching signal before the cycle period expires, the timing circuit can cause the boost circuit to output a pulse and the cycle period to restart.

In other embodiments, a machine-readable non-transitory storage medium is set forth. The storage medium can store instructions that, when executed by a processor included in a computing device, cause the computing device to carry out steps that include generating a switching signal for a subsystem of a display device based on a cycle period. The steps can further include detecting pulses in the switching signal, wherein, when a pulse is not detected in the switching signal before a cycle period expires, the timing circuit causes a pulse to be output to the subsystem and the cycle period restarts.

In yet other embodiments, a computing device is set forth. The computing device can include a processor and a display device. The display device can include a boost circuit configured to output a switching signal to a subsystem of the display device based on a minimum frequency threshold. The display device can further include a timing circuit configured to detect the frequency of the switching signal. The timing circuit can be further configured such that when the timing circuit determines that the frequency of the switching signal is approaching a minimum frequency threshold, the timing circuit can turn on a current sink electrically coupled to the timing circuit in order to increase a load of the boost circuit thereby causing an increase in the frequency of the switching signal.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments discussed herein relate to a boost converter of a display device that can operate in a pulse frequency modulation (PFM) mode. The PFM mode is designed to ensure that the frequency of a switching signal used to switch on light emitting diodes (LED's) of the display device is above an audible frequency threshold. In this way, a user who is operating the display device is not interrupted by audible noise generated from the display device. The boost converter is configured to operate according to a minimum switching frequency using control circuitry configured to analyze and respond to changes in the switching signal. The frequency of the switching signal is monitored to determine when the frequency is decreasing, and, in response, a load can be applied to the output of the boost converter until the frequency increases. The monitoring is performed by a control circuit or module within the boost converter, which uses a timer that cycles according a pre-programmed period. The pre-programmed period corresponds to the minimum switching frequency to be enforced on the boost converter. For example, when the minimum switching frequency is set to 20 kilohertz, the pre-programmed period will be 50 microseconds. The timer operates to cause the boost converter to output a pulse according to the minimum switching frequency. In some embodiments, when the timer performs a complete cycle without a pulse being detected in the switching signal, a pulse will be generated by the boost converter and the timer will start a new cycle. Additionally, when a pulse is detected in the switching signal during a cycle of the timer, the timer will reset to start a new cycle. In this way, the timer helps to ensure that a pulse is provided by the boost converter at least during every cycle of the timer. The timer can cause a pulse to be generated, or an increase in switching frequency to occur, by turning on a current sink electrically coupled to the boost converter. Therefore, when the frequency is decreasing, the current sink can be turned on causing the boost converter to compensate for the additional load associated with the current sink. In order to compensate, the boost converter increases the frequency of the switching signal. When the frequency is increasing, the current sink can be turned off in order to prevent the switching frequency from continually increasing after the switching frequency has passed the minimum switching frequency of the boost converter.

These and other embodiments are discussed below with reference to FIGS. 1-6; however, those skilled in the art will readily appreciate that the detailed description given herein with respect to these figures is for explanatory purposes only and should not be construed as limiting.

Figure 1:
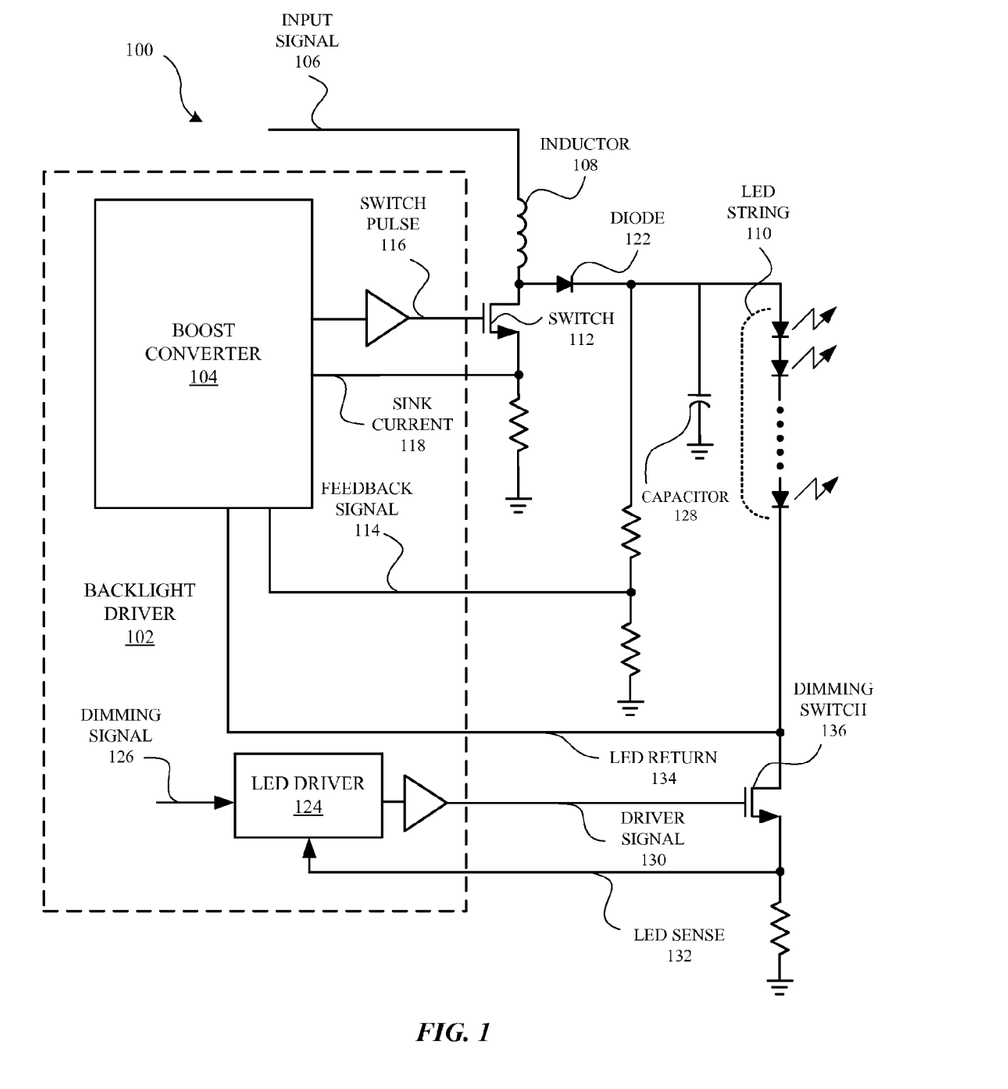
FIG. 1 illustrates a system diagram of a backlight driver according to some embodiments discussed herein.

FIG. 1 illustrates a system diagram 100 of a backlight driver 102 according to some embodiments discussed herein. A boost converter 104 can be used in combination with a light emitting diode (LED) driver 124 to create the voltages needed for driving an LED string 110. However, when using various switching mechanisms at the backlight driver 102, there is a potential for audible or acoustic noise to be generated from the components used in the backlight driver 102 or other components electrically coupled to the backlight driver 102. For example, some ceramic capacitors at an input or output of a power supply, such as a direct current (DC) to DC converter, can be the source of such noise. Additionally, the inductors coupled to the backlight driver 102 can also generate significant audible or acoustic noise. In order to reduce such noise, the backlight driver 102 can use a fixed frequency pulse width modulation (PWM) mode. During the fixed frequency PWM mode, audible noise can be controlled by choosing the switching frequency that is greater than the human hearing limit (i.e., >20 kHz). However, when the switching frequency is above the human hearing limit, the switching action can still cause vibrations in the backlight driver 102 to occur. Additionally, during a PWM mode, the switching frequency can be set to inaudible frequencies (e.g., greater than 100 kHz) thereby creating no acoustic issue. However, a power supply providing power to achieve the PWM mode can operate inefficiently during periods where only a small load is being applied to the power supply. In order to improve power efficiency, PWM mode can be switched to a pulse frequency modulation (PFM) mode according to some embodiments discussed here.

During the PFM mode, the switching frequency can change as the load changes. Consequently, unlike PWM mode, in the PFM mode the switching frequency may not be well controlled, thereby allowing the switching frequency to drop to or below the human hearing limit thereby creating audible noise. In order to prevent the generation of audible noise when operating in a PFM mode, a switching frequency can be controlled using control circuitry designed to keep the switching frequency above a pre-programmed minimum frequency. Therefore, audible noise can be avoided by ensuring the PFM mode switching frequency of the backlight driver 102 is always greater than the frequency of audible sound (i.e., at least 20 kHz).

The backlight driver 102 can include the boost converter 104, which is configured to boost the voltage received by the LED string 110. The backlight driver 102 operates to allow the input signal 106 to energize an inductor 108 and a capacitor 128 when the switch 112 is opened. The switch 112 can be opened and closed according to a switch pulse 116, which acts to toggle according to a switching frequency. When the switch 112 is closed, feedback signal 114 will be provided back to the boost converter 104. In this way, the boost converter 104 can sense the current output provided by the power supply and/or recycle current drawn from the power supply via the input signal 106. When the switch 112 is opened, any energy left in the inductor 108 and any charge left in a capacitor 128 will be forced through the LED string 110 according to the operation of diode 122. Current generated during the closing of a switch 112 can be fed back into the boost converter 104 via the feedback signal 114. In this way, changes in load can be monitored to determine how the load is affecting the switching frequency.

The backlight driver 102 can further include an LED driver 124 configured to control a switch 112 according to a dimming signal 126 and/or an LED sense 132 signal. The dimming signal 126 can determine a frequency at which switch 112 will be toggled. The dimming switch 136 can be configured to allow the boost converter 104 to transmit current through the LED string 110. The dimming switch 136 can frequently receive a driver signal 130 from the LED driver 124 and cause the dimming switch 136 to close, permitting the boost converter 104 to transmit current through the LED string 110. When the dimming switch 136 is open, little or no current is permitted to transfer through the LED string 110. However, the capacitor 128 can still discharge into the LED string 110 causing an increase in the fall time for the current through the LED string 110. Thereafter, when the capacitor 128 is being recharged, there will be an increase in the rise time of the current through the LED string 110. This rise and fall of the current through the LED string 110 can be captured by the LED return 134 provided to the boost converter 104 to further ensure that the backlight driver 102 is not operating at an audible frequency. For example, if the backlight driver 102 is operating at an audible frequency, the backlight driver 102 can intelligently increase its load by drawing current from a sink current 118 in order to boost the switching frequency to an inaudible frequency. When in PFM mode, the frequency of switching will vary with the load applied to the boost converter 104. As the load current required is lowered (e.g., as a result of dimming the LEDs), the switching frequency is also lowered. However, when the load becomes too low, the switching frequency can drop below a pre-programmed switching frequency threshold (e.g., at least 20 kHz in some embodiments). If the load requirements or any other conditions tend to drive the frequency lower than the switching frequency threshold, an additional switch pulse can be output by the boost converter, or the switching frequency can be increased by increasing the load to ensure the frequency does not drop below the switching frequency threshold. This can be performed according to control circuitry within the boost converter 104.

Figure 2:
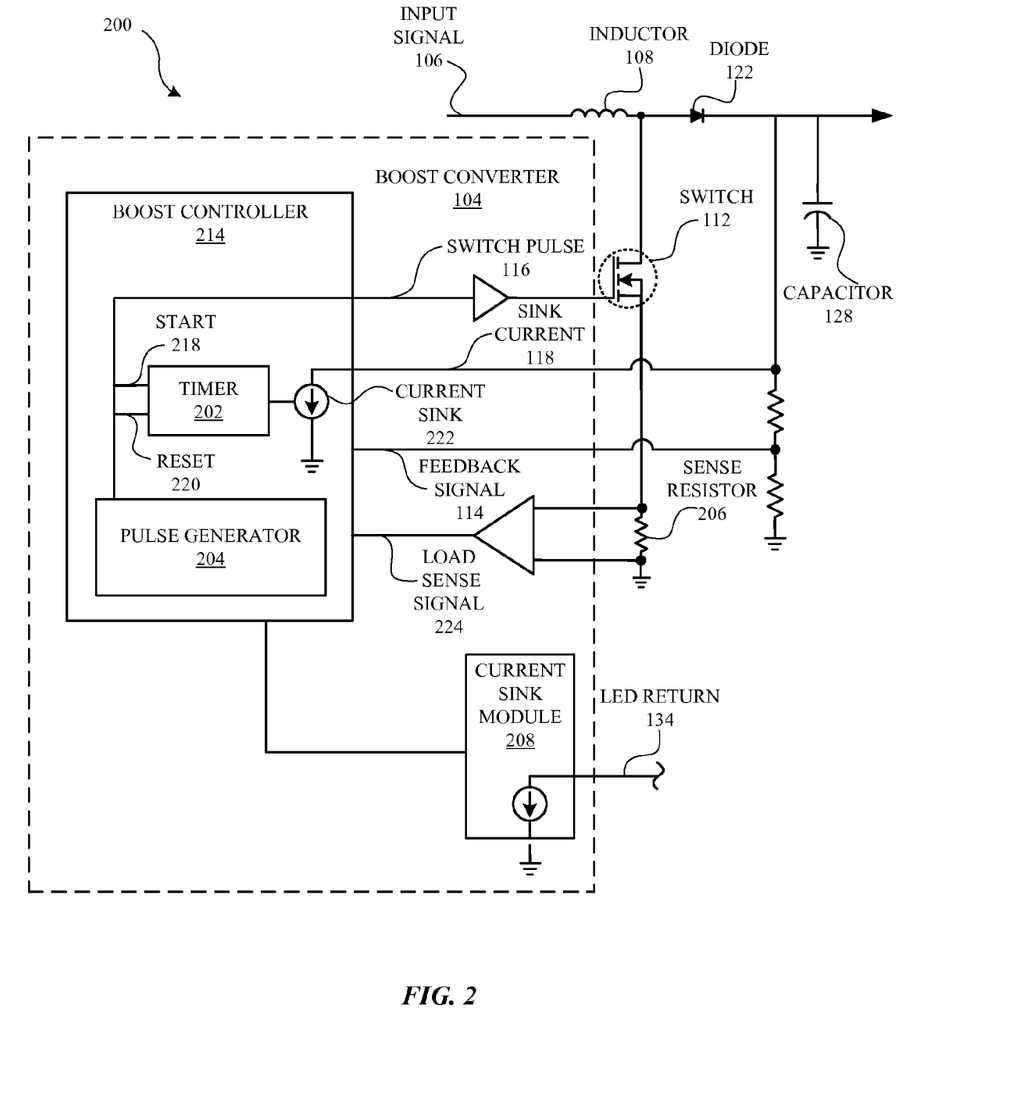
FIG. 2 illustrates a system diagram of a boost converter and some of the subsystems used to enforce a minimum switching frequency at the boost converter.

FIG. 2 illustrates a system diagram 200 of the boost converter 104 and some of the subsystems used to enforce a switching frequency threshold on the boost converter 104. The system diagram 200 incorporates some of the elements from FIG. 1, however, more detail is provided for understanding the operation of the boost converter 104. The boost converter 104 can include a boost controller 214 having a timer 202 configured to measure a time between pulses of a switch pulse 116 provided by the boost converter 104. The timer 202 can include a start 218 and a reset 220. The start 218 can be initiated at the beginning of a cycle or period for detecting a pulse or immediately after the reset 220 is triggered. The start 218 initiates a counter for detecting a pulse of the switch pulse 116 and if a pulse is not detected within a predetermined period or cycle, the timer 202 can cause the pulse generator 204 to insert a supplemental pulse into the switch pulse 116. Once the supplemental pulse is inserted into the switch pulse 116, the reset 220 causes the timer 202 to reset. If a pulse is detected during the predetermined period, the reset 220 can cause the timer to reset. In this way, the boost converter 104 always ensures that a pulse is occurring within the predetermined period or at least at a certain frequency. In some embodiments, the boost converter 104 can include multiple timers that operate according to different periods respectively such that each timer can adjust the frequency of the switch pulse 116 independently.

The boost controller 214 can also be configured such that when the frequency of the switch pulse 116 approaches a minimum switching frequency, a current sink 222 is turned on. Specifically, when the time between pulses drops below a predetermined period corresponding to the minimum switching frequency, an additional load is applied to the boost converter by turning on the current sink 222. A current increase at the current sink 222 can cause an increase in frequency for the switch pulse 116 generated by the pulse generator 204. Once the frequency of the switch pulse 116 has increased to above the minimum switching frequency, the current sink 222 can be turned off. By turning off the current sink 222, a decrease in a load of the boost converter 104 occurs causing a decrease in frequency or no change in frequency to switch pulse 116. In some embodiments, the load can be measured at least partially based on a load sense signal 224 derived from current that passes through a sense resistor 206. The sense resistor 206 can have a resistive value suitable for measuring the load of the boost converter 104. Moreover, in some embodiments, multiple frequency thresholds are enforced by the boost controller 214. Each frequency threshold can each be associated with a unique current increase or current decrease. In this way, the changes frequency of the switch pulse 116 can cause different current increases or decreases depending on a magnitude of the change in frequency of the switch pulse 116. In some embodiments, a frequency threshold period can be equal to or greater than 20 kilohertz. In this way, at least one pulse will be generated every 50 microseconds. In other embodiments, the boost controller 214 can operate according to multiple frequency thresholds not limited to approximately 22, 25, 28, 30, 32 and or 35 kilohertz. In yet other embodiments, the boost controller 214 can operate according to any suitable frequency thresholds that are less than and/or greater than 20 kilohertz.

In some embodiments, the boost controller 214 can operate to maintain a charge of the capacitor 128 at a minimum voltage level without constantly increasing the charge of the capacitor. The capacitor 128 can be charged according to the switch pulse 116, which acts to toggle switch 112. However, between pulses of the switch pulse 116, the charge delivered to the capacitor 128 should be discharged by a load before the next switch pulse, otherwise charge accumulates at the capacitor 128 and the capacitor voltage level starts to rise. In order to curb the rise of the capacitor 128 voltage level, the boost controller 214 can be configured to prevent the capacitor voltage level from continually receiving charge. A first approach is to ensure that the minimum possible charge is delivered at the lowest allowable frequency in the PFM mode, and that subsequently the charge is removed from the capacitor 128 by the load (e.g., the LED string 110). A second approach is to allow the capacitor voltage level to rise above its expected value by a programmable or predetermined voltage margin. Once the voltage level of the capacitor 128 exceeds the voltage margin, a load is connected to discharge the capacitor 128 to a nominal voltage level. For example, in some embodiments, the boost converter 104 can include a current sink module 208 electrically coupled to an LED return 134. When the feedback signal 114 indicates that the voltage level of the capacitor 128 has risen above the voltage threshold, the boost controller 214 will enable the current sink module 208 and cause the current sink module 208 to discharge the capacitor 128 to the nominal voltage level. In this way, the boost converter 104 can operate to reduce power consumption and optimize the performance of a display device in which the boost converter 104 can be electrically coupled.

Figure 3:
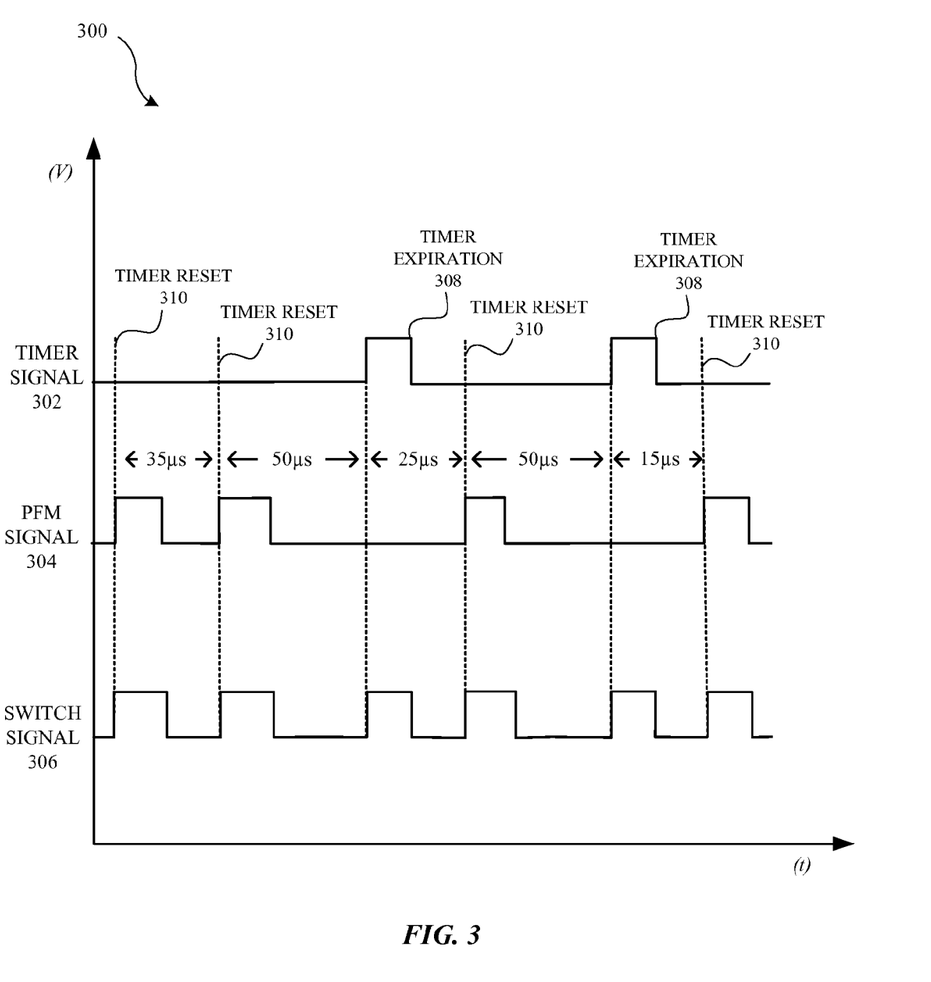
FIG. 3 illustrates the operation of a timer of the boost converter that is configured to ensure that a pulse is provided by the boost converter according to a programmed period.

FIG. 3 illustrates a plot 300 of how the timer 202 can be configured to ensure that a pulse is provided by the boost converter 104 according to a minimum switching frequency during a PFM mode. Specifically, the plot 300 illustrates an example of the timer 202 operating according to a programmed period of 50 µs. In this way, the timer 202 can maintain a minimum switching frequency of 20 kHz when operating in the PFM mode discussed herein. The timer signal 302 operates as a counter that causes a pulse to be output by the boost converter 104 at the timer expiration 308 or when the programmed period ends without detecting a pulse. Therefore, if the timer 202 never receives a timer reset 310 during a programmed period, the timer 202 will cause a pulse to be generated at the end or beginning of every programmed period. A PFM signal 304 corresponds to pulses generated by the boost converter 104 operating in the PFM mode. As illustrated in plot 300, occasionally the periods between the pulses can vary from 35 µs to 75 µs, which means that the corresponding frequencies sometimes drop below 20 kHz. In order to prevent the switching frequency to not drop below 20 kHz, the timer 202 can be used to insert a pulse in between periods that exceed 50 μs.

The timer 202 can be configured to reset according to a timer reset 310 whenever 50 μs has elapsed or a pulse has been generated by the boost converter 104 during a cycle or period of the timer 202. In FIG. 3, there is initially a new pulse generated by the boost converter 104, therefore the 50 μs timer resets upon detecting the first pulse of the switch signal 306. After 35 μs, the boost converter 104 generates a new pulse, so the 50 μs timer resets itself again at timer reset 310. Subsequently, after 50 μs, there is no new pulse detected in the PFM signal 304 by the time of the timer expiration 308, so the 50 μs timer causes a new pulse to be generated in the switch signal 306 and the timer 202. After 25 μs, there is a new pulse generated by the boost converter, so the timer 202 again resets according to the timer reset 310. After 50 μs from the subsequent timer reset 310, the timer 202 reaches another timer expiration 308 because no new pulse was generated for the PFM signal 304 by the boost converter 104. As a result, the 50 μs timer causes a new pulse to be generated in the switch signal 306 at the timer expiration 308 and the timer 202 resets to start a new cycle. Thereafter, after 15 μs, the boost converter generates a new pulse, so the 50 μs timer resets itself at the last timer reset 310. As a result, the switch signal 306 corresponds to a pulsed signal having a period equal to or less than 50 μs and thus a frequency greater than 20 kHz. The boost converter 104 and other systems depending on the boost converter 104 will therefore be maintained at a switching frequency that is inaudible. In this way, a user who is operating a display device that includes the boost converter 104 will not have their user experience interrupted by audible sounds coming from the display device.

Figure 4:
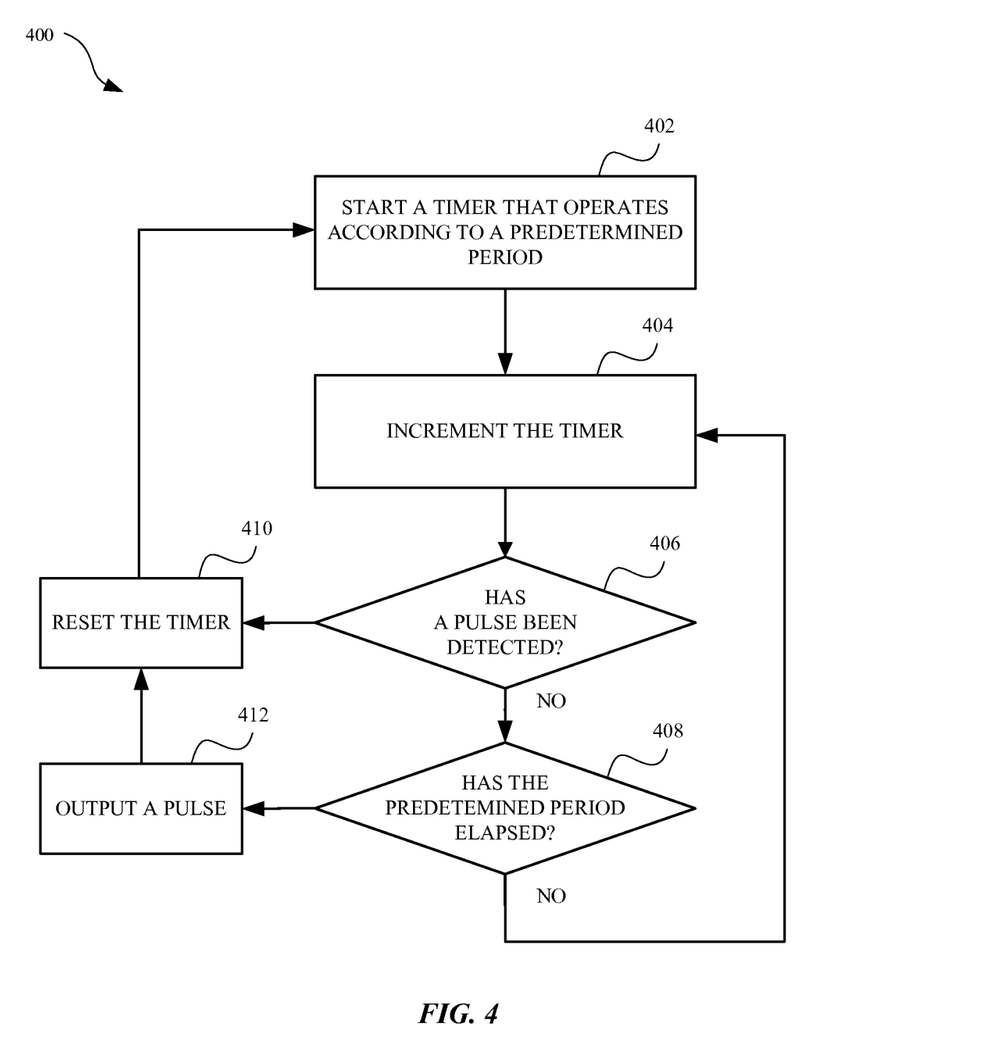
FIG. 4 illustrates a method for ensuring that a boost converter is operating above a minimum frequency threshold.

FIG. 4 illustrates a method 400 for ensuring that a boost converter 104 is operating outside of an audible frequency range. The method 400 can be performed by any suitable apparatus, system, or module discussed herein. The method 400 can include a step 402 of starting a timer that operates according to a predetermined period. The predetermined period can correspond to a frequency that a periodic signal is to stay above. At step 404, the timer is incremented. The increment can be seconds, milliseconds, microseconds, nanoseconds, or any other suitable time increment. At step 406, a determination is made as to whether a pulse has been detected by the timer or other suitable apparatus or module. If a pulse has been detected then the timer is reset at step 410 and step 402 is executed again. If no pulse has been detected, then at step 408 a determination is made as to whether the predetermined period has elapsed. If the predetermined period has elapsed then an output pulse is generated at step 412. Thereafter, the timer is reset at step 410 and step 402 is executed again. If the predetermined period has not elapsed, then the time is incremented at step 404. In this way, the timer will continue operating in a way that ensures the period of the pulses of the periodic signal do not have a period that is greater than the predetermined period.

Figure 5:
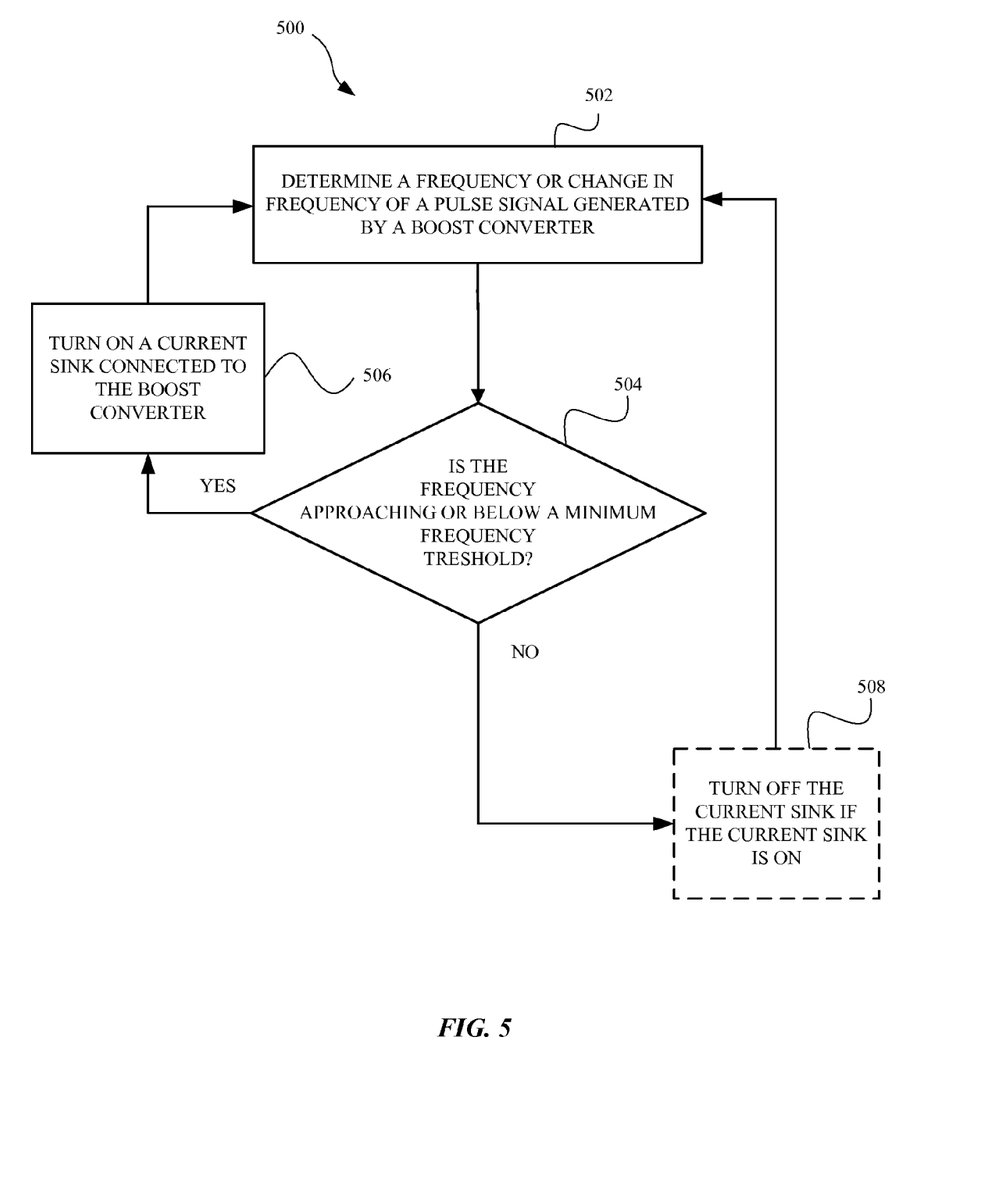
FIG. 5 illustrates a method for maintaining a switching frequency of a pulse signal from a boost converter above a minimum frequency threshold.

FIG. 5 illustrates a method 500 for maintaining a switching frequency of a pulse signal from a boost converter above a minimum frequency threshold. The method 500 can be performed by any suitable apparatus, system, or module discussed herein. The method 500 can include a step 502 of determining a frequency or change in frequency of a pulse signal generated by a boost converter. At step 504, a determination is made as to whether the frequency is approaching or below a minimum frequency threshold. If the frequency is approaching or below the minimum frequency threshold then, at step 506, a current sink connected to the boost converter is turned on and step 502 is repeated. If the frequency is not approaching or below the minimum frequency threshold then, at optional step 508, the current sink is turned off (if the current sink was previously on) in order to reduce a load of the boost converter. The boost converter operates such that an increase or decrease in load will cause an increase or decrease in the pulse signal frequency respectively. In this way, by toggling the current sink based on the frequency of the pulse signal, the frequency of the pulse signal can be kept above the minimum frequency threshold.

Figure 6:
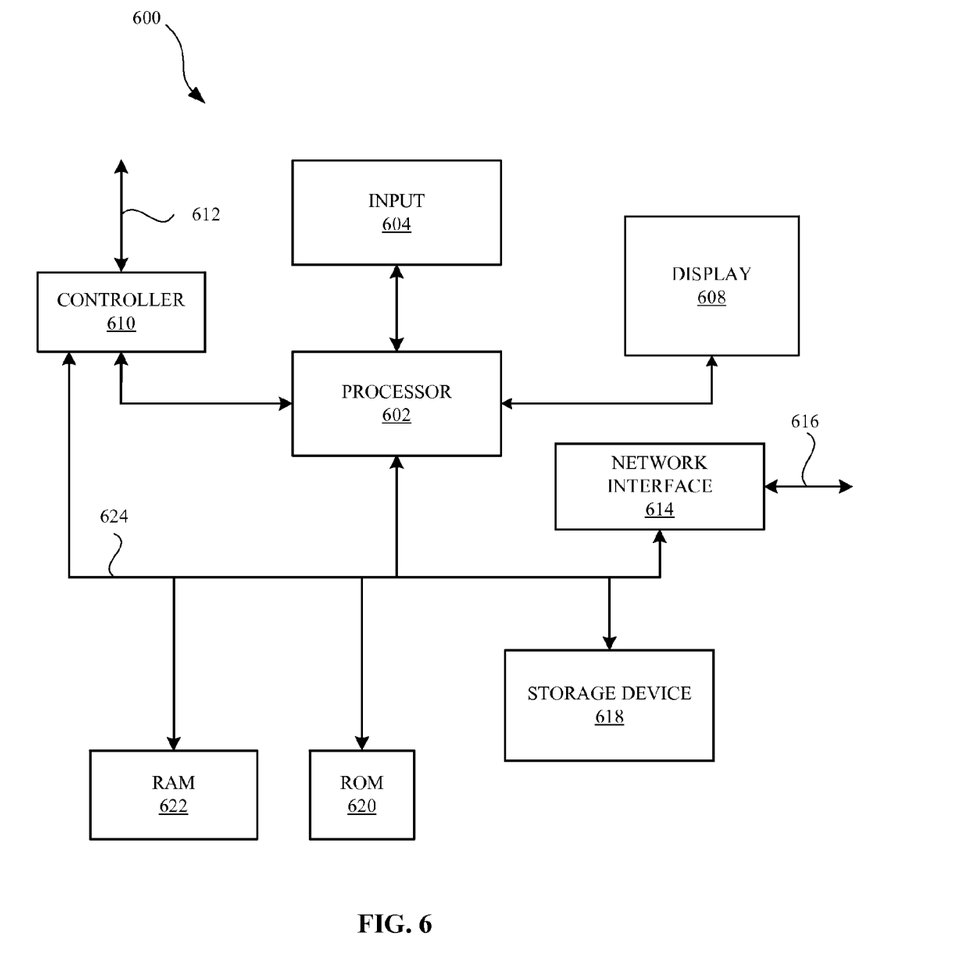
FIG. 6 is a block diagram of a computing device that can represent the components of any of the systems, apparatus, and/or modules discussed herein.

FIG. 6 is a block diagram of a computing device 600 that can represent the components of the boost converter 104, boost controller 214, timer 202, or any of the systems, apparatus, and/or modules discussed herein. It will be appreciated that the components, devices or elements illustrated in and described with respect to FIG. 6 may not be mandatory and thus some may be omitted in certain embodiments. The computing device 600 can include a processor 602 that represents a microprocessor, a coprocessor, circuitry and/or a controller for controlling the overall operation of computing device 600. Although illustrated as a single processor, it can be appreciated that the processor 602 can include a number of processors. The number of processors can be in operative communication with each other and can be collectively configured to perform one or more functionalities of the computing device 600 as described herein. In some embodiments, the processor 602 can be configured to execute instructions that can be stored at the computing device 600 and/or that can be otherwise accessible to the processor 602. As such, whether configured by hardware or by a combination of hardware and software, the processor 602 can be capable of performing operations and actions in accordance with embodiments described herein.

The computing device 600 can also include user input device 604 that allows a user of the computing device 600 to interact with the computing device 600. For example, user input device 604 can take a variety of forms, such as a button, keypad, dial, touch screen, audio input interface, visual/image capture input interface, input in the form of sensor data, etc. Still further, the computing device 600 can include a display 608 (screen display) that can be controlled by processor 602 to display information to a user. Controller 610 can be used to interface with and control different equipment through equipment control bus 612. The computing device 600 can also include a network/bus interface 614 that couples to data link 616. Data link 616 can allow the computing device 600 to couple to a host computer or to accessory devices. The data link 616 can be provided over a wired connection or a wireless connection. In the case of a wireless connection, network/bus interface 614 can include a wireless transceiver.

The computing device 600 can also include a storage device 611, which can have a single disk or a number of disks (e.g., hard drives) and a storage management module that manages one or more partitions (also referred to herein as "logical volumes") within the storage device 618. In some embodiments, the storage device 618 can include flash memory, semiconductor (solid state) memory or the like. Still further, the computing device 600 can include Read-Only Memory (ROM) 620 and Random Access Memory (RAM) 622. The ROM 620 can store programs, code, instructions, utilities or processes to be executed in a non-volatile manner. The RAM 622 can provide volatile data storage, and store instructions related to components of the storage management module that are configured to carry out the various techniques described herein. The computing device 600 can further include data bus 624. Data bus 624 can facilitate data and signal transfer between at least processor 602, controller 610, network interface 614, storage device 618, ROM 620, and RAM 622.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A control circuit for a display device, the control circuit comprising:
    a boost circuit configured to output a switching signal to a subsystem of the display device based on a minimum frequency threshold; and
    a timing circuit configured to detect pulses in the switching signal, wherein, when the timing circuit does not detect a pulse in the switching signal before a cycle period of the timing circuit expires, the cycle period restarts and timing circuit causes the boost circuit to output a supplemental pulse to ensure that a frequency of the switching signal stays above the minimum frequency threshold.

2. The control circuit of claim 1, wherein the timing circuit is configured to restart the cycle period when the timing circuit detects the pulse before the cycle period expires.

3. The control circuit of claim 2, wherein the cycle period corresponds to a frequency that is at least 20 kilohertz.

4. The control circuit of claim 1, wherein the timing circuit is configured to turn on a current sink of the boost circuit when the frequency of the switching signal is approaching or below the minimum frequency threshold.

5. The control circuit of claim 4, wherein the timing circuit is configured to turn off the current sink of the boost circuit when the timing circuit detects the pulse in the switching signal before the cycle period expires.

6. The control circuit of claim 1, further comprising:
    a voltage detector electrically coupled to a capacitor of the subsystem, wherein the voltage detector is configured to detect a capacitor voltage and enable a current sink in order to discharge the capacitor when the capacitor voltage reaches or exceeds a capacitor voltage threshold.

7. The control circuit of claim 6, wherein the voltage detector is further configured to discharge the capacitor to a nominal charge level for supplementing a charge signal provided to a series of light emitting diodes (LEDs) of the display device.

8. A machine-readable non-transitory storage medium storing instructions that, when executed by a processor included in a computing device, cause the computing device to carry out steps that include:
    generating a switching signal for a subsystem of a display device based on a minimum frequency threshold; and
    generating a supplemental pulse when a pulse is not detected in the switching signal during a cycle period, wherein the cycle period is reset when the pulse is generated and the cycle period corresponds to a frequency that is equal to or greater than the minimum frequency threshold.

9. The machine-readable non-transitory storage medium of claim 8, wherein the steps further include:
    restarting the cycle period upon detecting the pulse before the cycle period expires.

10. The machine-readable non-transitory storage medium of claim 9, wherein the minimum frequency threshold corresponds to a frequency that is at least 20 kilohertz.

11. The machine-readable non-transitory storage medium of claim 8, wherein the steps further include:
    turning on a current sink when a frequency of the switching signal is approaching or below the minimum frequency threshold.

12. The machine-readable non-transitory storage medium of claim 8, wherein the steps further include:
    turning off a current sink when the pulse is detected in the switching signal before the cycle period expires.

13. The machine-readable non-transitory storage medium of claim 8, wherein the steps further include:
    detecting a capacitor voltage and enabling a current sink in order to discharge a capacitor when the capacitor voltage reaches or exceeds a capacitor voltage threshold.

14. The machine-readable non-transitory storage medium of claim 13, wherein the steps further include:
    enabling the current sink in order to discharge the capacitor to a nominal voltage level for supplementing a charge signal provided to a series of light emitting diodes (LEDs) of the display device.

15. A computing device, comprising:
    a processor; and
    a display device, comprising:
        a boost circuit configured to output a switching signal to a subsystem of the display device based on a minimum frequency threshold; and
        a timing circuit configured to detect pulses in the switching signal during a cycle period, wherein, when the timing circuit does not detect a pulse in the switching signal before the cycle period expires, the cycle period restarts and the timing circuit causes the boost circuit to output a supplemental pulse into with the switching signal.

16. The computing device of claim 15, wherein the timing circuit is configured to restart the cycle period when the timing circuit detects the pulse before the cycle period expires.

17. The computing device of claim 16, wherein the cycle period corresponds to a frequency that is at least 20 kilohertz.

18. The computing device of claim 15, wherein the timing circuit is configured to turn on a current sink of the boost circuit when the timing circuit does not detect the pulse in the switching signal before the cycle period expires.

19. The computing device of claim 15, wherein the timing circuit is configured to turn off a current sink of the boost circuit when the timing circuit detects the pulse in the switching signal before the cycle period expires.

20. The computing device of claim 15, further comprising:
a voltage detector electrically coupled to a capacitor of the subsystem, wherein the voltage detector is configured to detect a capacitor voltage and enable a current sink in order to discharge the capacitor when the capacitor voltage reaches or exceeds a capacitor voltage threshold.

* * * * *